Figure 2:
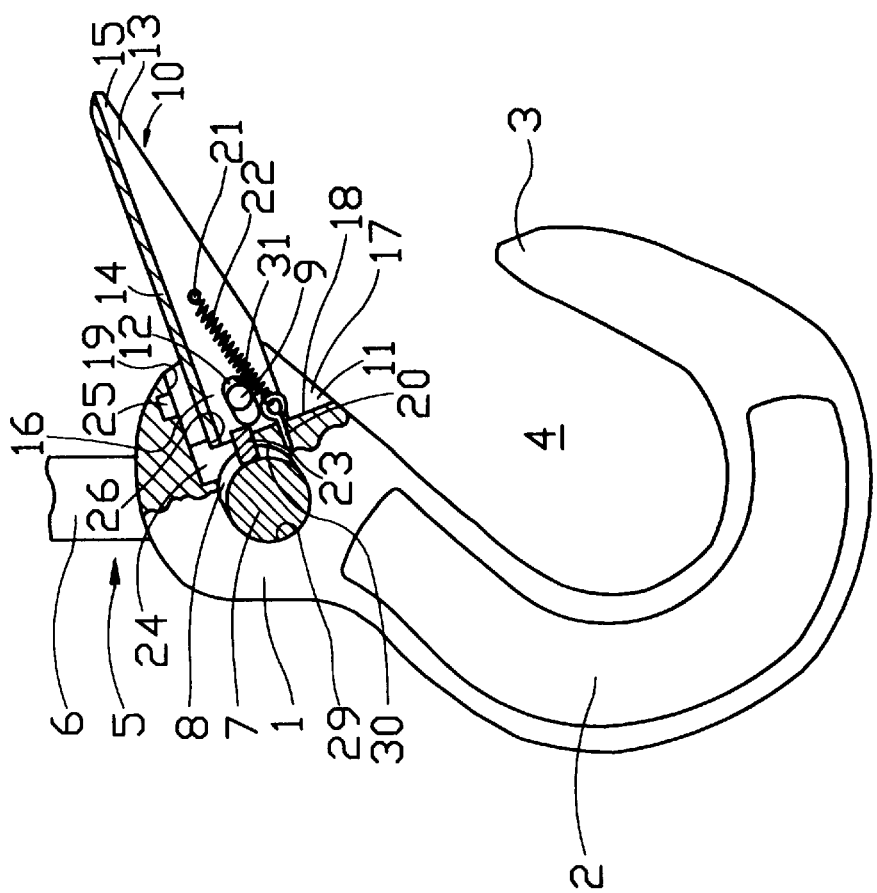

United States Patent
Wiklund

[19]

[11] Patent Number: 5,899,512
[45] Date of Patent: May 4, 1999

[54] LIFTING HOOK

[76] Inventor: Henry Wiklund, Backvagen 1, S 820 10 Arbra, Sweden

[21] Appl. No.: 08/929,923

[22] Filed: Sep. 15, 1997

[30] Foreign Application Priority Data

Oct. 3, 1996 [SE] Sweden ................................ 9603607

[51] Int. Cl.⁶ ...................................................... B66C 1/36
[52] U.S. Cl. ...................... 294/82.19; 24/599.3; 24/599.7
[58] Field of Search .................................. 294/82.19, 82.2, 294/82.21, 82.31; 24/599.1, 599.3–599.7, 599.9

[56] References Cited

U.S. PATENT DOCUMENTS

| | | |
|---|---|---|
| 1,273,717 | 7/1918 | Anderson et al. .................... 294/82.19 |
| 1,576,197 | 3/1926 | Kuffel et al. .......................... 294/82.19 |
| 1,794,694 | 3/1931 | Jensen et al. ......................... 294/82.19 |
| 4,118,840 | 10/1978 | Fengels . |
| 4,320,561 | 3/1982 | Muller et al. . |
| 5,292,165 | 3/1994 | Wiklund . |

FOREIGN PATENT DOCUMENTS 16783 of 1912 United Kingdom .

*Primary Examiner*—Johnny D. Cherry
*Attorney, Agent, or Firm*—Mark P. Stone

[57] ABSTRACT

Lifting hook having a safety latch (10) arranged in a cavity (11) in the hook, which latch can be swung outwards and which is locked in closed position thereby that, by a spring (22), it is displaced to support, with end surfaces of slots (12), against a safety latch shaft (9). A corner portion (28) and a protruding member (23) thereby prevent a swinging outwards of the safety latch by supporting against an inner wall (18) in the cavity and a recess (25), respectively, in an upper wall (19). To open the hook, the safety latch is pulled downwards against the spring force, so that the corner portion (28) runs free from the inner wall and the safety latch can be swung outwards. The safety latch can be arranged to be lowered automatically when the hook is loaded on the commencement of a lifting operation, a suspension shaft (7) thereby, by being displaced in a slot (8) acting on the protruding member (23) so that the safety latch is released and is lowered by the spring force and locked.

12 Claims, 2 Drawing Sheets

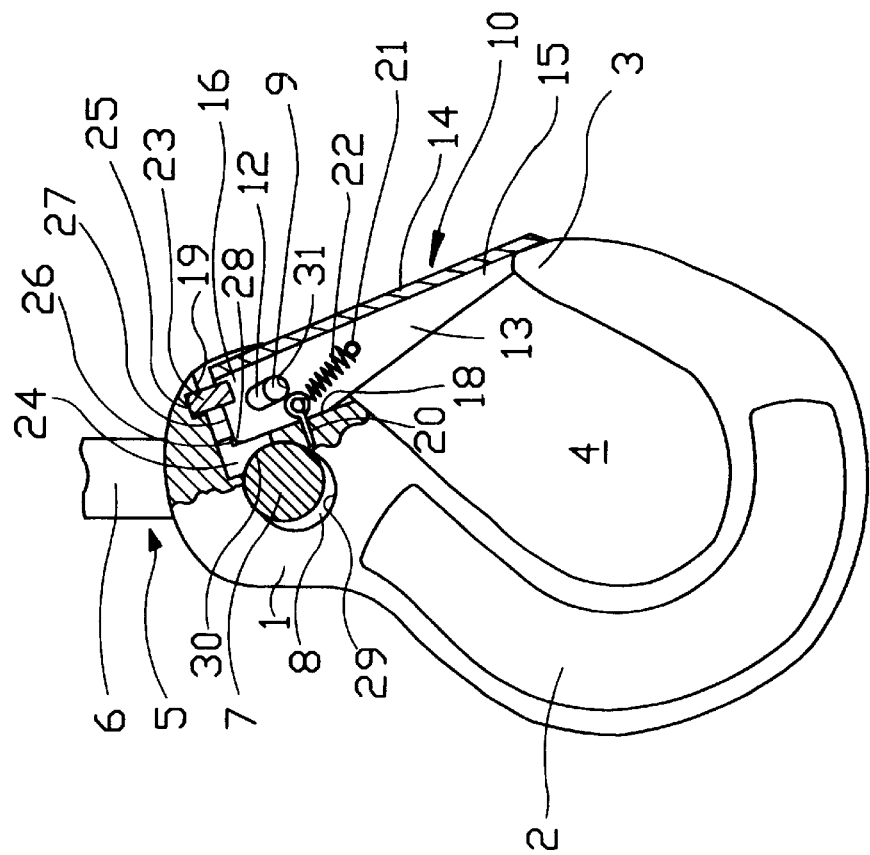
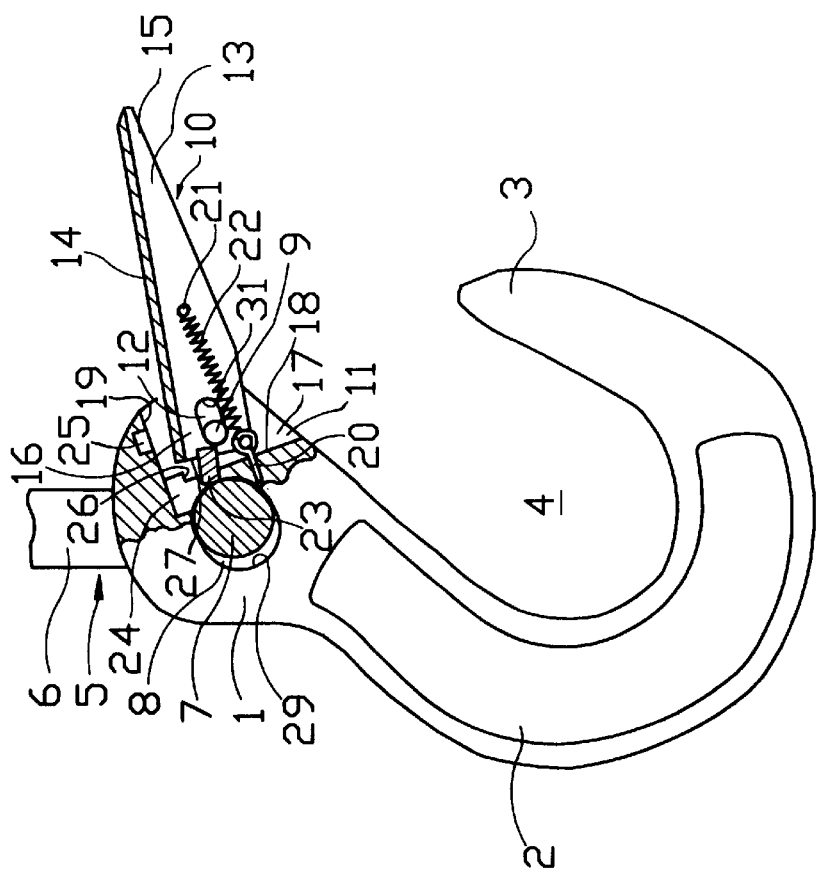

LIFTING HOOK

LIFTING HOOK

Lifting hooks having a spring-loaded safety latch which is swung inwards, as well as so-called safety hooks having a safety latch which is swung outwards and is self-locking in its closed position have the disadvantage that the operator of the hooks often hurts his fingers more or less seriously. This because one hand must be used to hold the safety latch aside when for example a chain fitted with an eyelet is to be lifted out of the hook. In the case of so-called safety hooks this applies also when more than one such chain is to be hooked on, as the hook closes as soon as the first chain has been attached and is loading the hook with its weight. During these operations, the fingers are in the way and may be injured. When other types of lifting means are used, too, the fingers are in the way. In the case of thick straps or the like it may, in addition, be difficult to obtain room inside the hook for a safety latch moving inwards, which it is therefore difficult to close as well as to open. This lowers the degree of safety and, what is still more dangerous, often makes the operator find the safety latch to be so much of an hindrance that he removes it.

In the abovementioned safety hooks it may happen that the hook remains open after a light lifting means has been hooked on, and closes only when a lifting operation is commenced. If in this case the operator should be holding the hook and happen to have his fingers in the way for the safety latch to which, when it closes, a great force is imparted which is generated by the weight of the load being lifted, the result can be a very serious injury. A further disadvantage in the known so-called safety hooks is that the locking member which secures the hook in its closed position may be hard to release for opening the hook, since, for one thing, it may seize during cold weather or due to dirt or corrosion and, for another thing, is small and difficult to operate with thick gloves.

THE OBJECTS OF THE INVENTION

The objects of the present invention are to obtain a lifting hook having a safety latch swinging outwards relatively to the hook opening which safety latch, after having been swung out by the operator for freeing the hook opening, will by itself remain in the swung-out position, so that the operator can use both his hands to insert or remove chains and other lifting means without having to have his fingers in the way in the hook opening, that a safe locking of the safety latch is obtained when it has been lowered into a position which closes the hook, that on the lowering of the safety latch no force great enough to cause an injury to the operator's fingers is imparted to it, that a good grip for releasing and opening the safety latch shall be possible to obtain even with thick gloves and that the safety latch thereby and due to the way in which it is arranged shall cause no opening difficulties due to seizure. Finally, an important object of the invention is also to be able to arrange the said lowering and locking of the safety latch to occur automatically due to the load on the hook which results on the commencement of a lifting operation.

These objects have been attained with the lifting hook in accordance with the invention such as it is defined in the Claims.

DRAWINGS

Figure 1:
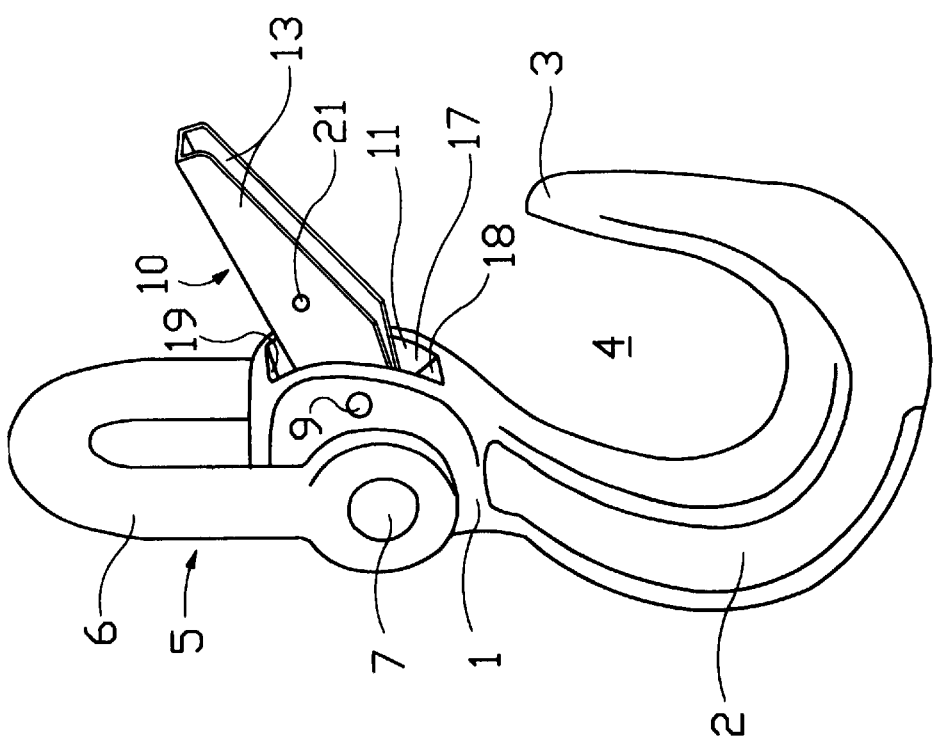

The invention is described closer in the following with reference to the attached drawings. In these, FIG. 1 shows a perspective view of a lifting hook in accordance with the invention with the safety latch in the lowered position, FIG. 2 is a partially sectioned side view of the hook with the safety latch raised, and FIGS. 3–4 are corresponding views showing different positions of the safety latch when it is being lowered.

DESCRIPTION OF AN EMBODIMENT OF THE INVENTION

In the drawings, the numeral 1 designates the suspension portion of the lifting hook, 2 the hook body and 3 the tip of the hook. The hook opening is designated 4. In the suspension portion, a suspension member 5 is arranged which comprises a U-shaped part 6 and a suspension shaft 7. The shaft is rotatably and radially displaceably arranged in an opening 8—shaped as a short slot—in the suspension portion 1.

Through the suspension portion a second shaft 9 is also passed for rotatable journalling of a safety latch 10. The safety latch shaft 9 passes through a cavity 11 in the suspension portion 1 and through slots 12, one in each of the side portions 13 of the safety latch, the latter being substantially U-shaped in cross section and having its two side portions connected by a back portion 14. In a lower portion 15 of the safety latch, the side and back portions straddle the hook tip 3 when the safety latch is lowered.

The upper portion 16 of the safety latch is inserted into the cavity 11 which is defined by two side walls 17, an inner wall 18 and an upper wall 19. In the inner wall 18, a first spring retainer 20 is fastened. Between this and a second spring retainer 21 in the safety latch, a tension spring 22 is arranged. From the upper portion of the safety latch, a member 23 protrudes which is narrower than the width of the safety latch.

In the cavity 11, a first recess 24 is made in the inner wall 18 and a second recess 25 in the upper wall 19, the recesses being narrower than the distance between the side walls 17. The inner wall 18 is provided with a shoulder 26 (see FIG. 3) against which the upper portion 16 of the safety latch can rest with its back portion 14. The recess 24 in the inner wall 18 of the cavity communicates with the slot 8 for the suspension shaft 7.

MODE OF FUNCTION, ADVANTAGES

The lifting hook is by means of the suspension portion 5 suspended from a wire rope or the like. In the position for reception of a lifting strap or similar, the safety latch 10 is raised in accordance with FIG. 2, which is made manually as described in closer detail below. The member 23 protruding from the safety latch retains, with the help of the force of the spring 22, the suspension shaft 7 at a lower end of the slot 8 which is inclined. The safety latch supports, with end surfaces 27 of its side portions 13, against the inner wall 18 and, with a short end part of the back portion 14, against the shoulder 26. The safety latch is hereby retained in its raised position.

The spring 22 is strong enough to retain the safety latch against the force of the lifting hook's own weight and the weight of hooked-on chains or similar. When the suspension shaft 7 is loaded additionally on the commencement of a lifting operation, the spring force is outweighed, so that the shaft is displaced to an upper end 30 of the slot 8 (FIG. 3). Thereby the safety latch 10 with its slots 12 is displaced relatively to the the safety latch shaft 9, so that the end of the back portion 14 is freed from the shoulder 26. Since the spring 22 is pulling against a point (the first spring retainer 20) which is located sideways from the slots journalling the safety latch on its shaft 9 and closer to the hook tip than the said shaft, a turning force in the lowering direction is imparted to the safety latch. Sliding, first with its protruding member 23 against the suspension shaft 7, then with a rounded corner surface 28 against the inner wall 18 and finally with the member 23 against the upper wall 19, the safety latch is swung down into closed position (FIG. 4) and pulled upwards by the spring to support against the safety latch shaft 9 with—referring to the said position—a lower end wall 31 of each of its slots 12, the protruding member 23 thereby moving into the recess 25 in the upper wall.

During the first stage of the closing movement it is accelerated very quickly as the member 23 slides along the smooth surface of the suspension shaft 7 which is curved in a direction away from it. There is therefore no risk of the movement being braked and stopped before it is completed, which is done in a fraction of a second.

The safety latch is thereby securely locked against being opened due to any forces which may be produced during the lifting operation. If during a raising movement it should rub against an obstacle, the safety latch cannot possibly be subjected to a force which both pulls it down and swings it outwards in the way necessary to free the hook opening which is described in closer detail below. On the lowering of the hook, the forces act in the direction opposite to the direction for pulling out the safety latch. If the hook should receive a sharp blow from below, an insignificant movement of the safety latch against the force of the spring 22 may result, but the spring force will in such a case return the safety latch in a fraction of a second.

What further increases the safety is that the upper portion 16 of the safety latch is inserted into the cavity 11, the upper wall 19 of which protects the upper end surfaces of the safety latch from being subjected to forces acting in a downwards direction. The side walls 17 of the cavity also contribute to preventing access to the safety latch for forces generated by obstacles which the hook may bump against. Furthermore, the safety latch should be made with smooth and, in its longitudinal direction, substantially straight surfaces which ensure low friction and gripping effect on contact with obstacles.

The side walls 17 of the cavity connect closely to the outer surfaces of the side portions 13 of the safety latch and therefore guide the safety latch laterally. In addition, it is in its lowered position guided thereby that the lower ends of the side portions and the back portion 14 straddle the tip 3 of the hook.

To open the lifting hook after a finished lifting operation, the operator suitably takes hold of the hook portion 2 with one hand and the safety latch 10 with his other hand, pulls the latter downwards so that the protruding member 23 leaves the recess 25 and the corner portion 28 comes sufficiently close to the safety latch shaft 9 to permit turning of the safety latch, and turns it up to the position in accordance with FIG. 2, the suspension shaft 7 thereby being moved to the lower end 29 of the slot 8. In order to make the shaft easy to move into this position, the operator should simultaneously, with the hand holding the hook body, relieve the shaft of the weight of the hook.

When the hook has been opened, the operator can insert or remove chains or other coupling means without having to hold the safety latch and have his fingers in the way. He can, if required, steady the hook with one hand without having his fingers in or near the hook opening, or he can use both hands for handling the coupling means, which especially in the case of heavy chains is facilitating and also reduces the risk of injuries caused by pinching, as they are handled with increased precision when more power is available.

It is desirable that the operator shall be able to hook on more than one chain or similar without the safety latch being lowered already when the first one has been hooked on. The suitable resistance against lowering of the safety latch can be determined by the choice of spring force of the tension spring 22 combined with the inclination of the slot 8. The resistance of the spring should also be so chosen that the operator can, without difficulty, pull out and raise the safety latch as described above but that this operation will, however, require relatively much power, so that the safety latch is securely retained in its lowered position during the lifting operations.

As the safety latch offers large and easily accessible hold surfaces for the operator's hand, it can be raised easily and comfortably even with thick gloves, and the sufficient amount of power can be used to prevent the resistance of the spring and the effect of possible seizure from causing any problems.

It should be noted that the only force acting on the safety latch on the lowering of same is that generated by the tension spring 22. The safety latch can therefore never cause any injuries to the operator's fingers by pinching even if the fingers should—although without reason—be in the way when the safety latch is lowered.

Even without the embodiment shown, with the insertion of the protruding member 23 of the safety latch into the recess 25, the safety latch is securely locked in its lowered position. This is because the surfaces of its side portions 13 which are opposite to the back portion 14 support against the inner wall 18 of the cavity up to a point at the transition to the corner portions 28 which is farther from the centre of the safety latch shaft 9 than the shortest distance from this centre to the inner wall. As described above, on the opening of the hook the safety latch must be pulled downwards in order to move the said point closer to the safety latch shaft, so that the corner portions 28 run free from the inner wall 18. It is thus, within the scope of the invention, possible to vary the arrangement for locking the safety latch. However, the arrangement in accordance with the described embodiment of the invention —i.e. with the additional locking obtained by insertion of the protruding member 23 into the recess 25—provides for an advantageous relationship between the distance from the point of locking to the centre of the safety latch shaft and the distance from the said centre to the tip 3 of the hook, which both reduces the strains if forces are generated which load the safety latch, and makes it easier to make its lower part connect closely to the tip of the hook, without too much play, when the safety latch is lowered.

In addition to the embodiment of the invention described above, it is also possible to make a simplified arrangement of the suspension of the hook in the opening 8, if the object of obtaining an automatic lowering of the safety latch on the commencement of a lifting operation is relinquished. In that case, the opening does not have to be slot-shaped for co-operation with a suspension shaft which is displaceable in it and which acts on a protruding member 23 of the safety latch. This member can thus be excluded, as also the recesses 24 and 25 in the cavity 11, and the shoulder 26 on its inner wall 18. In this embodiment, the hook is less costly to manufacture, but the safety is reduced since it is possible to neglect or forget the lowering of the safety latch before the commencement of a lifting operation.

Other variations of the design of the lifting hook are also possible within the scope of the Claims, and the embodiments shown and described above are examples only.

I claim:

1. Lifting hook comprising a curved hook body (2) extending from a suspension portion (1) thereof to a tip (3) which, together with the suspension portion, defines a hook opening (4), an opening (8) in the suspension portion for connection of a suspension member (5) for the hook, and a safety latch (10) which, in an upper portion (16) thereof, is rotatably journalled in the suspension portion (1) by means of a safety latch shaft (9) and is substantially U-shaped in cross section with two side portions (13) at a distance from each other which are connected by a back portion (14), which safety latch extends, when closing the hook opening (4), with a lower portion (15) to the tip (3) of the hook, and which safety latch can be swung outwards from said tip for freeing the hook opening (4), characterized in that the safety latch (10) is, with its upper portion (16) arranged in a cavity (11) in the suspension portion (1), said cavity enclosing, by side walls (17), two sides of said upper portion (16) and also being defined by an inner wall (18), that the safety latch shaft (9) is passed through said side walls (17) and an oblong slot (12) in each of the side portions (13) of the upper portion (16) of the safety latch, that a spring (22) is arranged between a first spring retainer (20) on the inner wall (18) and a second spring retainer (21) in the safety latch between its side portions (13), said spring striving, on the lowering of the safety latch for the closing of the hook opening (4), to displace the safety latch (10) towards a position in which an end wall (31) of each of its slots (12), which end wall is closest to the lower portion (15) of the safety latch, supports against the safety latch shaft (9), that in said position an upper corner portion (28) of each side portion (13) of the safety latch connects closely to the inner wall (18) on a level which is situated higher than the safety latch shaft (9) and at a longer distance from said shaft than the point on said inner wall which is closest to said shaft, a turning outwards and raising of the safety latch (10) thereby not being possible, and that the safety latch can by hand, against the action of the spring (22), be pulled into a position in which the upper corner portion (28) comes closer to the safety latch shaft (9) and permits said turning and raising of the safety latch.

2. Lifting hook in accordance with claim 1, characterized in that, in the raised position of the safety latch (10), end surfaces (27) of its upper portion (16) are by the action of the spring (22) pressed against the inner wall (18) and thereby retain the safety latch in said position.

3. Lifting hook in accordance with claim 2, characterized in that the upper portion (16) of the safety latch is located inside—in the lifting position of the hook—an upper defining wall (19) of the cavity (11).

4. Lifting hook in accordance with claim 3, having the opening in the suspension portion (1) shaped as a short slot (8) inclined relatively to the horizontal plane and having the suspension member (5) being arranged in said suspension portion provided with a suspension shaft (7) which is arranged to be rotatable and radially displaceable in said slot (8), characterized in that in the inner wall (18) of the cavity (11) a recess (24) is provided which is narrower than the distance between the side walls (17) of said cavity and which communicates with the slot (8) in the suspension portion (1), that a shoulder (26) is provided on the inner wall (18), against which shoulder an end part of the back portion (14) supports when the safety latch is in its raised position, that on the safety latch (10) a protruding member (23) is provided which, in the said position, extends through the recess (24) in the inner wall (19) and supports against the suspension shaft (7) which thereby, by means of a preselected force of the spring (22) is retained at a lower end (29) of the inclined slot (8) and that, when the suspension shaft (7) is, on the commencement of a lifting operation, acted on by a force which is greater then the spring force, said shaft is displaced to an upper end (30) of said slot, the end part of the back portion (14) thereby being freed from the shoulder (26) and the spring being arranged to impart to the safety latch (10) a turning movement into a position in which the hook opening (4) is closed.

5. Lifting hook in accordance with claim 4, characterized in that, on the said turning movement of the safety latch (10) into a position in which the hook opening (4) is closed, the spring (22) is arranged to pull up the protruding member (23), during the final stage of said movement, into a recess (25) provided in the upper wall (19) of the cavity (11) for retaining the safety latch in said position.

6. Lifting hook in accordance with claim 2, having the opening in the suspension portion (1) shaped as a short slot (8) inclined relatively to the horizontal plane and having the suspension member (5) being arranged in said suspension portion provided with a suspension shaft (7) which is arranged to be rotatable and radially displaceable in said slot (8), characterized in that in the inner wall (18) of the cavity (11) a recess (24) is provided which is narrower than the distance between the side walls (17) of said cavity and which communicates with the slot (8) in the suspension portion (1), that a shoulder (26) is provided on the inner wall (18), against which shoulder an end part of the back portion (14) supports when the safety latch is in its raised position, that on the safety latch (10) a protruding member (23) is provided which, in the said position, extends through the recess (24) in the inner wall (19) and supports against the suspension shaft (7) which thereby, by means of a preselected force of the spring (22) is retained at a lower end (29) of the inclined slot (8) and that, when the suspension shaft (7) is, on the commencement of a lifting operation, acted on by a force which is greater then the spring force, said shaft is displaced to an upper end (30) of said slot, the end part of the back portion (14) thereby being freed from the shoulder (26) and the spring being arranged to impart to the safety latch (10) a turning movement into a position in which the hook opening (4) is closed.

7. Lifting hook in accordance with claim 6, characterized in that, on the said turning movement of the safety latch (10) into a position in which the hook opening (4) is closed, the spring (22) is arranged to pull up the protruding member (23), during the final stage of said movement, into a recess (25) provided in the upper wall (19) of the cavity (11) for retaining the safety latch in said position.

8. Lifting hook in accordance with claim 1, characterized in that the upper portion (16) of the safety latch is located inside—in the lifting position of the hook—an upper defining wall (19) of the cavity (11).

9. Lifting hook in accordance with claim 8, having the opening in the suspension portion (1) shaped as a short slot (8) inclined relatively to the horizontal plane and having the suspension member (5) being arranged in said suspension portion provided with a suspension shaft (7) which is arranged to be rotatable and radially displaceable in said slot (8), characterized in that in the inner wall (18) of the cavity (11) a recess (24) is provided which is narrower than the distance between the side walls (17) of said cavity and which communicates with the slot (8) in the suspension portion (1), that a shoulder (26) is provided on the inner wall (18), against which shoulder an end part of the back portion (14)

supports when the safety latch is in its raised position, that on the safety latch (10) a protruding member (23) is provided which, in the said position, extends through the recess (24) in the inner wall (19) and supports against the suspension shaft (7) which thereby, by means of a preselected force of the spring (22) is retained at a lower end (29) of the inclined slot (8) and that, when the suspension shaft (7) is, on the commencement of a lifting operation, acted on by a force which is greater then the spring force, said shaft is displaced to an upper end (30) of said slot, the end part of the back portion (14) thereby being freed from the shoulder (26) and the spring being arranged to impart to the safety latch (10) a turning movement into a position in which the hook opening (4) is closed.

10. Lifting hook in accordance with claim 9, characterized in that, on the said turning movement of the safety latch (10) into a position in which the hook opening (4) is closed, the spring (22) is arranged to pull up the protruding member (23), during the final stage of said movement, into a recess (25) provided in the upper wall (19) of the cavity (11) for retaining the safety latch in said position.

11. Lifting hook in accordance with claim 1, having the opening in the suspension portion (1) shaped as a short slot (8) inclined relatively to the horizontal plane and having the suspension member (5) being arranged in said suspension portion provided with a suspension shaft (7) which is arranged to be rotatable and radially displaceable in said slot (8), characterized in that in the inner wall (18) of the cavity (11) a recess (24) is provided which is narrower than the distance between the side walls (17) of said cavity and which communicates with the slot (8) in the suspension portion (1), that a shoulder (26) is provided on the inner wall (18), against which shoulder an end part of the back portion (14) supports when the safety latch is in its raised position, that on the safety latch (10) a protruding member (23) is provided which, in the said position, extends through the recess (24) in the inner wall (19) and supports against the suspension shaft (7) which thereby, by means of a preselected force of the spring (22) is retained at a lower end (29) of the inclined slot (8) and that, when the suspension shaft (7) is, on the commencement of a lifting operation, acted on by a force which is greater then the spring force, said shaft is displaced to an upper end (30) of said slot, the end part of the back portion (14) thereby being freed from the shoulder (26) and the spring being arranged to impart to the safety latch (10) a turning movement into a position in which the hook opening (4) is closed.

12. Lifting hook in accordance with claim 11, characterized in that, on the said turning movement of the safety latch (10) into a position in which the hook opening (4) is closed, the spring (22) is arranged to pull up the protruding member (23), during the final stage of said movement, into a recess (25) provided in the upper wall (19) of the cavity (11) for retaining the safety latch in said position.

* * * * *